United States Patent
Robinson et al.

(10) Patent No.: US 7,886,826 B2
(45) Date of Patent: *Feb. 15, 2011

(54) GEL CAPSULES FOR SOLIDS ENTRAINMENT

(75) Inventors: Geoff Robinson, Spring, TX (US); Radovan Rolovic, Sugar Land, TX (US); Philip F. Sullivan, Bellaire, TX (US); Golchehreh Salamat, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/765,925

(22) Filed: Apr. 23, 2010

(65) Prior Publication Data
US 2010/0206567 A1      Aug. 19, 2010

Related U.S. Application Data

(63) Continuation of application No. 10/778,967, filed on Feb. 13, 2004, now Pat. No. 7,703,529.

(51) Int. Cl.
*E21B 37/00*   (2006.01)
*E21B 37/08*   (2006.01)
*B08B 9/093*   (2006.01)
*B08B 9/027*   (2006.01)

(52) U.S. Cl. .................. 166/305.1; 166/311; 134/22.1; 134/22.11; 134/22.12; 134/22.18

(58) Field of Classification Search .............. 166/311, 166/312, 305.1
See application file for complete search history.

(56) References Cited

U.S. PATENT DOCUMENTS

| 2,232,946 | A | * | 2/1941 | Hefley .................. 166/300 |
| 4,060,130 | A | * | 11/1977 | Hart ..................... 166/312 |
| 4,421,656 | A | | 12/1983 | Donatelli et al. |
| 4,439,328 | A | | 3/1984 | Moity |
| 4,474,240 | A | | 10/1984 | Oliver, Jr. et al. |
| 4,561,985 | A | | 12/1985 | Glass, Jr. |
| 4,860,830 | A | * | 8/1989 | Jennings et al. ........... 166/312 |
| 5,327,974 | A | * | 7/1994 | Donovan et al. ........... 166/311 |
| 5,591,699 | A | | 1/1997 | Hodge |
| 5,783,527 | A | | 7/1998 | Dobson, Jr. et al. |
| 5,881,813 | A | | 3/1999 | Brannon et al. |
| 5,975,220 | A | | 11/1999 | Mueller et al. |
| 6,302,209 | B1 | | 10/2001 | Thompson, Sr. et al. |
| 6,367,566 | B1 | | 4/2002 | Hill |
| 6,419,019 | B1 | | 7/2002 | Palmer et al. |
| 6,497,290 | B1 | | 12/2002 | Misselbrook et al. |
| 6,599,863 | B1 | | 7/2003 | Palmer et al. |

(Continued)

*Primary Examiner*—Zakiya W Bates
*Assistant Examiner*—Angela M Ditrani
(74) *Attorney, Agent, or Firm*—Rachel Greene; David Cate; Robin Nava

(57) ABSTRACT

A method for treating a subterranean wellbore. More specifically, a method for removing wellbore solids. A first, polymer containing fluid is placed in the solids bed. A second, viscosifying fluid is then placed into the solids bed thereby agitating the solids in the bed and causing the formation of a gel capsules when mixed with the biopolymer fluid. These gel capsules are capable of trapping or entraining the agitated solids. The gel capsules typically have a relatively high volume and a relatively low density, thereby making their removal from the wellbore easier.

20 Claims, 1 Drawing Sheet

U.S. PATENT DOCUMENTS

| | | |
|---|---|---|
| 6,607,607 B2 | 8/2003 | Walker et al. |
| 6,814,145 B2 | 11/2004 | Maberry et al. |
| 6,818,598 B2 | 11/2004 | Maberry et al. |
| 2005/0028979 A1 | 2/2005 | Brannon et al. |

* cited by examiner

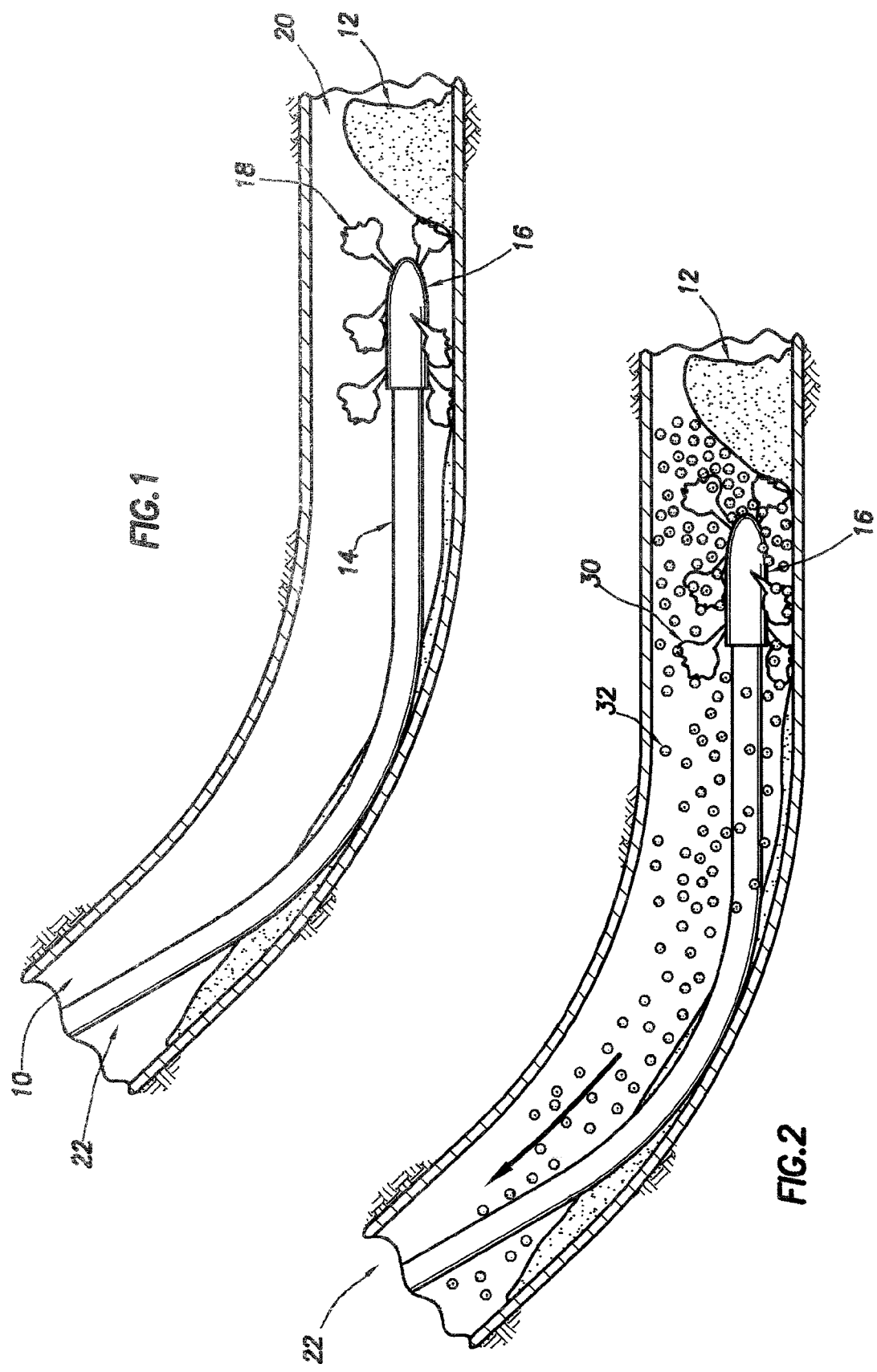

GEL CAPSULES FOR SOLIDS ENTRAINMENT

This continuation application claims priority to U.S. patent application Ser. No. 10/778,967, filed Feb. 13, 2004, entitled, "Gel Capsules for Solids Entrainment," now U.S. Pat. No. 7,703,529, which is incorporated by reference herein.

BACKGROUND OF THE INVENTION

1. Field of the Invention

The present invention relates generally to a method for solids entrainment. More specifically, the invention is a method for entrainment and removal of solids from a wellbore through the use of a relatively low density gel.

2. Description of the Prior Art

During typical fracturing operations a variety of particulate or solid materials, such as sand, are introduced to the wellbore. Producing wells can also introduce fines and other solids that may ultimately reduce production by restricting the flow of oil. In both these cases the solids must be cleaned or removed from the wellbore. In favorable cases water can be used to remove the solids, but this requires high flow rates with annular velocities in the order of 150 ft/min. It is usual to use viscosified solutions of polymers, and particularly biopolymers, such as hydroxyethyl cellulose (HEC), xanthan or guar and rely on the reduced settling rate in the fluid to clean the hole.

Because the settling rate is not zero, the result of such operations typically result in the spread of solids over a longer portion of the wellbore.

SUMMARY OF THE INVENTION

The present invention describes a method for entraining or capturing sand, proppant or other solids in a wellbore, thereby aiding in their removal therefrom. A fluid or a combination of fluids are provided into the wellbore at or near the site or location of the solids to be removed. The fluids form a strong or viscous gel which traps or entrains the solid material. Typically, the viscous gel has a relatively low specific gravity, thereby making its removal from the wellbore less difficult.

In yet another aspect of the invention, a suitable gel may be formed using an emulsion. Typically, a polymer and a crosslinker or viscosifier are combined in the oil phase of the emulsion. A suitable surfactant or emulsifier, as well as other additives or constituents may also be present in the oil phase. Once formed, the oil phase is combined with the brine solution or other aqueous phase to form the emulsion. Although both the polymer and the crosslinker are present together in a single phase, crosslinking cannot occur until both the polymer and the crosslinker are exposed to an aqeuous or brine solution. As the emulsion is pumped through the BHA, the resultant pressure drop causes the emulsion to invert, bringing the polymer, crosslinker and brine together and thereby forming a gel. U.S. patent application Ser. No. 10/172,259, now U.S. Pat. No. 6,818,598 (filed Jun. 14, 2002 and issued on Nov. 16, 2004), and U.S. patent application Ser. No. 10/172,266, now U.S. Pat. No. 6,814,145 (filed Jun. 14, 2002 and issued on Nov. 9, 2004), both of which are incorporated herein by reference, describe this type of emulsion chemistry. The emulsion may be either an oil-in-water (oiw) or water-in-oil (wio) emulsion.

The polymer solution is pumped or placed downhole in the area or zone where the solids to be removed are located. This placement is typically accomplished using a suitable bottom hole assembly ("BHA"). The polymer fluid is placed in sufficient quantity to cover the entire solids bed. The BHA is typically positioned near the bottom or distal end of the solids bed initially and then pulled back into the open hole side of the solids bed as the placement procedure continues, thereby ensuring a more adequate polymer fluid saturating of the solids bed.

Once the solids bed is sufficiently covered or saturated with the polymer fluid, a second viscosifying fluid is pumped into the bed. The viscosifying fluid typically includes an additive for forming mono- or di-valent cations within the solution. The fluid may also include additional polymer additives. The second fluid is typically a lower viscosity fluid and serves two primary functions. First, the viscosifying fluid increases the viscosity of the polymer fluid, thereby forming a gel. Second, the viscosifying fluid provides agitation within the solids bed, allowing the gel to entrain the solids more thoroughly. Under agitation, the gel tends to form relatively large volume, low density capsules which may be easily swept or removed from the wellbore. This removal may be accomplished by flushing the wellbore out with a suitable fluid or, in some cases, may be accomplishing simply by pulling the BHA back up the wellbore.

In another aspect of the invention, the polymer solution and the viscosifying solution may be provided substantially simultaneously into the solids bed. In this case, it is typical for the polymer solution and the viscosifying solution to be chosen such that the shear and/or pressure drop through the BHA cause the two solutions to mix and viscosify sufficiently to form a gel for capturing or entraining the solids. One method for providing the two fluids simultaneously is through the use of concentric tubing. A first, smaller diameter tubing may be provided inside a second, larger diameter tubing, thereby forming an annulus between the first and second tubings. One fluid may be pumped down the first tubing and the second fluid may pumped down the annulus. In this way, the two fluids do not mix until they reach the BHA. As the fluids are mixing, but before a suitable gel is formed, the mixture is pumped out of the nozzles or openings in the BHA and into the solids bed.

In yet another aspect of the invention, a suitable gel may be formed using an emulsion. Typically, a polymer and a crosslinker or viscosifier are combined in the oil phase of the emulsion. A suitable surfactant or emulsifier, as well as other additives or constituents may also be present in the oil phase. Once formed, the oil phase is combined with the brine solution or other aqueous phase to form the emulsion. Although both the polymer and the crosslinker are present together in a single phase, crosslinking cannot occur until both the polymer and the crosslinker are exposed to an aqeuous or brine solution. As the emulsion is pumped through the BHA, the resultant pressure drop causes the emulsion to invert, bringing the polymer, crosslinker and brine together and thereby forming a gel. U.S. patent application Ser. No. 10/172,259 (filed Jun. 14, 2002) and U.S. patent application Ser. No. 10/172, 266 (filed Jun. 14, 2002), both of which are incorporated herein by reference, describe this type of emulsion chemistry. The emulsion may be either an oil-in-water (oiw) or water-in-oil (wio) emulsion.

BRIEF DESCRIPTION OF THE DRAWINGS

FIG. 1 is a schematic showing placement of the biopolymer solution.

FIG. 2 is a schematic showing placement of the viscosifying solution.

DETAILED DESCRIPTION OF THE PREFERRED EMBODIMENTS

The present invention is a method for treating a wellbore having solids contained therein. Examples of such solids commonly found in wellbores include, but are not limited to, sand, proppant and solids resulting from wellbore damage. Removal of these solids may be necessary for any number of reasons, for instance, decreased wellbore access or decreased formation production.

FIG. 1 shows a typical wellbore 10 having a aggregation of solids or solids bed 12 therein. In a preferred embodiment of the present invention, a coiled tubing string 14 having a bottom hole assembly 16 is passed into the wellbore. The BHA is extended substantially into the solids bed. Once the BHA is in place, a first, polymer solution 18 is passed through the coiled tubing and dispersed or placed into the solids bed. In a preferred embodiment, the polymer solution comprises a biopolymer. Suitable biopolymer solutions are described, infra. Alternatively, any suitable polymer may be used which is capable of being crosslinked to form a gel. For instance, polyacrylamides and dervatives thereof and polyvinyl alcohols are preferred polymers for use in the present invention. A sufficient quantity of polymer solution is pumped into the solids bed to adequately saturate or wet the solids forming the bed. In a preferred embodiment, this saturation or wetting step may be performed while pulling out of hole ("POOH") (i.e., withdrawing the BHA from the distal or bottomhole end 20 of the solids bed to the proximal or openhole end 22 of the bed). In this way, more complete saturation of the solids bed may be realized.

Once the first fluid is placed, a second, viscosifying fluid 30 is pumped into the solids bed, as shown in FIG. 2. The viscosifying fluid, described infra, may have any suitable viscosity but preferably has a lower viscosity than the biopolymer fluid. As previously described, the BHA 16 is preferably positioned or located at or near the openhole side 22 of the solids bed 12 following the placement of the first, biopolymer solution. As the second, viscosifying fluid is pumped downhole into the solids bed, sufficient force is provided to agitate or disturb the solids in the solids bed. The BHA may be run in hole ("RIH") or moved from the open hole end of the solids bed toward the closed hole end thereby providing more complete agitation of the bed and more complete mixing with the polymer fluid. In yet another embodiment, the second fluid may be placed or supplied as the BHA is run back and forth from the open-hole to bottom-hole end of the solids bed.

As the viscosifying fluids mixes with the biopolymer fliud, a viscous or stong gel is formed. In a preferred embodiment, the gel has a frequency dependent solids-like modulus that is approximately two orders of magnitude higher than the liquid-like modulus. The turbulent action provided by the viscosifying fluid, in addition to agitating the solids in the solids bed, also causes the gel to form relatively large, low volume capsules 32. These capsules trap or entrain the agitated solids. Preferably, the gel capsules have a specific gravity in the range of about 0.2-1.5. More preferably, the gel capsules have a specific gravity of about 1.1-1.2. The capsules are more easily swept from or otherwise removed from the wellbore. Any suitable method or mechanism may be used to remove the capsules from the wellbore, however, in a preferred embodiment water or a salt or brine solution at low flow rates is used.

In addition to providing the polymer fluid and the viscosifying fluid, a gas may also be provided to foam the gel, further reducing the specific gravity of the gel capsules. Any method known in the art may be used for forming the foam. In a preferred embodiment, the gas is mixed with the viscosifying fluid. Alternatively, however, the gas may be provided in polymer fluid or in both the polymer fluid and viscosifying fluid.

The biopolymer fluid of the present invention may be any suitable fluid comprising a biopolymer. In a preferred embodiment, the biopolymer solution comprises a biopolymer and water. While any suitable biopolymer may be used, the following are preferred: carrageenan, alginate, gellan, konjacmannan, xanthan and guar. In a first embodiment, the biopolymer is mixed or blended with the water to form the biopolymer fluid. Additional additives may be included in the biopolymer fluid. For instance, it may be desirable to adjust the pH of the fluid. In a preferred embodiment, the pH of the biopolymer fluid is approximately 10. The pH may be adjusted using any suitable material, for instance sodium hydroxide. Other additives may include foam stabilizers and corrosion inhibitors.

Fibers may be included in polymer fluid and/or the viscosifying fluid to further aid in capturing or entraining solids material. Any suitable fibers may be used. For instance, polypropylene, KYNOL™, novoloid, fiberglass, and cellulosic-based materials are all useful in the present invention. A preferred fiber is polyethylene terepthalate. The fibers may be incorporated into the polymer and/or viscosifying fluids or into the emulsion. In a preferred embodiment, the fibers have a length in the range of about 1-25mm. More preferably, the fibers have a length in the range of 3-6mm.

The viscosifying fluid of the present invention may be of any suitable composition capable of producing a strong gel when mixed with the polymer fluid. Where the polymer fluid includes a biopolymer, preferred viscosifying fluids may include a mono- or di-valent cation source or a crosslinker. The choice of cation source or crosslinker typically depends on the type of polymer used. For instance, where guar is included in the polymer fluid, a crosslinker would preferably be used in the viscosifying fluid, more preferably a borate crosslinker could be used. A preferred source for monovalent cations is potassium chloride ("KCl"). A preferred source for divalent cations is calcium chloride ("$CaCl_2$"). Where the polymer solution does not include a biopolymer, such as when a polyacrylamide or polyvinyl alcohol are used in the polymer fluid, metal-based crosslinkers (including, but not limited to zirconium and titanium based crosslinkers), borates or organic crosslinkers, such as formaldehyde, resorcinol acetates, may be used.

In an alternative embodiment, the polymer fluid and the viscosifying fluid may be provided substantially simultaneously to the solids bed. By providing the two fluids simultaneously, the number of trips into and out of the hole may be reduced. In this embodiment, the polymer fluid and viscosifying fluid are preferably chosen such that crosslinking or gelling does not occur until the two fluids near the solids bed. More preferably, the crosslinking or gelling does not occur until the two fluids exit the BHA.

EXAMPLES

The following examples demonstrate various embodiments of the present invention:

Example 1

A first, biopolymer solution or fluid was prepared comprising 2% (w/w) of iota carrageenan in water. Ten gallons of the fluid was pumped into the annular space of a simulated wellbore. The annular space also contained approximately one gallon of sand prior to placement of the biopolymer fluid. The sand was positioned to create a sand bed.

A second, viscosifying solution or fluid was prepared comprising 2% KCl in water. This viscosifying fluid was pumped through the coiled tubing at 10 gpm. The nozzle was moved downhole through the carrageenan solution and sand bed. This treatment resulted in the formation of gel balls or capsules containing sand from the sand bed.

Example 2

A first, biopolymer solution or fluid was prepared comprising 50 gallons of 0.45% (w/w) guar solution was adjusted to pH 10 with 40 gm sodium hydroxide. The testing apparatus was filled with this solution. One gallon of sand was introduced into the annulus. With the nozzle placed approximately 6 ft from the sand bed, circulation was established at 10 gpm. Flow was switched to a 20 gallon tank containing a second, viscosifying solution or fluid comprising 5.2 g/gal of borate in water. An approximately 50/50 mix was achieved with the guar solution by traversing the sand bed in 6 seconds when flow was switched back to the guar solution. Again, evidence of gel formation was observed with sand trapped in the gel network.

Example 3

A first, biopolymer solution or fluid was prepared comprising 50 gallons of a 0.3% konjacmannan solution. In a separate tank 25 gallons of 0.5% xanthan solution at pH 10 was prepared. The experimental procedure described in Example 2 was repeated, using the 50 gallon solution to fill the system. Results showed the formation of gel capsules containing entrained sang in the gel.

Example 4

A first, polymer solution was prepared comprising 1% alginate and 0.5% of a wetting agent. A second, viscosifying solution was prepared comprising 1% $CaCl_2$. Approximately 15 gallons of the first solution was placed in 5 gallons of bauxite sand. A BHA was run through the polymer saturated sand and a mixture of the viscosifying fluid (at 38 gals/min) and air (at 50 psi) was introduced into the solids bed for approximately 25-30 seconds. Following this, water was circulated and the BHA was removed. Results showed the creation of relatively smaller gel capsules which contained entrained sand from the solids bed.

We claim:

1. A method of treating a producing well by removing solids from a wellbore, the method comprising the steps of:
   (a) placing a first, polymer-containing fluid in the wellbore, wherein the polymer comprises a polymer selected from the group consisting of a carrageenan, alginate, gellan, konjacmannan, xanthan and guar;
   (b) placing a second, viscosifying fluid in the wellbore, wherein the second, viscosifying fluid increases the viscosity of said first fluid;
   (c) forming a viscous gel in the wellbore which entrains the solids; and,
   (d) removing the viscous gel and the entrained solids from the wellbore.

2. The method of claim 1, wherein said second fluid agitates a solids bed.

3. The method of claim 2, wherein the first fluid is placed in a solids bed while pulling out of hole whereby the solids bed is saturated with the first fluid.

4. The method of claim 1, wherein said first fluid and said second fluid are placed through coiled tubing.

5. The method of claim 4, wherein said coiled tubing comprises a bottom hole assembly.

6. The method of claim 5, wherein the second fluid is pumped through the bottom hole assembly while the bottom hole assembly is run in hole, whereby agitation of a solids bed and mixing with the first fluid is achieved.

7. The method of claim 5, wherein the second fluid is placed while the bottom hole assembly is run back and forth relative a solids bed.

8. The method of claim 1, wherein said polymer fluid comprises iota-carrageenan.

9. The method of claim 1, wherein the polymer-containing fluid and said viscosifying fluid form a gel when mixed.

10. The method of claim 1, wherein said viscosifying fluid is a crosslinker.

11. The method of claim 1, wherein said viscosifying fluid is a source of mono- or di-valent cations.

12. The method of claim 11, wherein said viscosifying fluid comprises potassium chloride.

13. The method of claim 11, wherein said viscosifying fluid comprises calcium chloride.

14. The method of claim 1, wherein said first fluid and said second fluid are placed substantially simultaneously.

15. The method of claim 14, wherein said first and second fluids are placed through concentric tubing.

16. The method of claim 1, further comprising the step of:
   (e) providing a gas to form a foam.

17. The method of claim 1, wherein the first fluid further comprises polyethylene terephthalate.

18. The method of claim 1, wherein the entrained solids comprise proppant and are entrained by the viscous gel and are from the wellbore.

19. The method of claim 1, wherein the first fluid or the second fluid further comprises fibers selected from the group consisting of polypropylene, polyethylene terephthalate, novoloid, and fiberglass materials.

20. The method of claim 1, wherein the first fluid and the second fluid are placed into the wellbore before a gel is formed.

* * * * *